US012732485B2

(12) United States Patent
Slenders et al.

(10) Patent No.: US 12,732,485 B2
(45) Date of Patent: Sep. 8, 2026

(54) TRANSITIVELY AUTHENTICATED REVERSE PROXY

(71) Applicant: Cisco Technology, Inc., San Jose, CA (US)

(72) Inventors: Jonathan Maria Jan Slenders, Ghent (BE); Frédéric René Philippe Detienne, Harze (BE); Alexandre Honoré, Schaerbeek (BE); Haitham Sufian Fayyad Jaradat, Pinhal Novo (PT)

(73) Assignee: CISCO TECHNOLOGY, INC., San Jose, CA (US)

( * ) Notice: Subject to any disclaimer, the term of this patent is extended or adjusted under 35 U.S.C. 154(b) by 93 days.

(21) Appl. No.: 18/631,353

(22) Filed: Apr. 10, 2024

(65) Prior Publication Data

US 2025/0119410 A1 Apr. 10, 2025

Related U.S. Application Data

(60) Provisional application No. 63/587,765, filed on Oct. 4, 2023.

(51) Int. Cl.
*H04L 9/40* (2022.01)

(52) U.S. Cl.
CPC ........ *H04L 63/0281* (2013.01); *H04L 63/083* (2013.01)

(58) Field of Classification Search
CPC H04L 63/0281; H04L 63/083; H04L 63/0884
See application file for complete search history.

(56) References Cited

U.S. PATENT DOCUMENTS

| | | | | |
|---|---|---|---|---|
| 2005/0251856 A1 | 11/2005 | Araujo et al. | | |
| 2014/0282978 A1* | 9/2014 | Lerner | H04L 63/083 726/7 | |

(Continued)

OTHER PUBLICATIONS

Avaya, "Creating a Reverse Proxy Service for Avaya Aura® Web Gateway," Avaya Documentation Center, https://documentation.avaya.com/hu-HU/bundle/DeployingOceanaSolution_r310/page/Creating_a_reverse_proxy_service_for_AAWG.html, Dec. 24, 2018, 2 pages.

(Continued)

*Primary Examiner* — Amir Mehrmanesh
*Assistant Examiner* — Thomas A Gyorfi
(74) *Attorney, Agent, or Firm* — Edell, Shapiro & Finnan, LLC

(57) ABSTRACT

Methods are provided for a proxy infrastructure that serves as a bridge between an enterprise network and a computing machine of a user ensuring a chain of trust. The methods involve obtaining, from a client device, a request to navigate to one or more target devices of a remote enterprise network and locally authenticating the client device based on at least one of an identity of the client device and user credentials. The methods further involve generating a connection request for the client device to navigate to the one or more target devices based on the client device being locally authenticated and providing the connection request to a proxy service executing in the remote enterprise network. The proxy service authenticates an access to the one or more target devices based on device credentials while hiding the device credentials from the client device.

20 Claims, 8 Drawing Sheets

(56) References Cited

U.S. PATENT DOCUMENTS

| | | | | |
|---|---|---|---|---|
| 2015/0128242 | A1* | 5/2015 | Hoy | H04L 63/0884 726/9 |
| 2015/0365412 | A1* | 12/2015 | Innes | H04L 63/12 726/7 |
| 2017/0310693 | A1 | 10/2017 | Howard et al. | |
| 2018/0159856 | A1 | 6/2018 | Gujarathi | |
| 2018/0302399 | A1* | 10/2018 | Khanduja | H04L 67/10 |
| 2020/0259798 | A1 | 8/2020 | Rene | |
| 2021/0258318 | A1* | 8/2021 | Greene | G06F 21/31 |

OTHER PUBLICATIONS

Secretless, “How Secretless Works,” Fundamentals, https://docs.secretless.io/Latest/en/Content/Overview/scl_how_it_works.htm, Jul. 23, 2021, 3 pages.

Ravoof S., “How to Set Up a Reverse Proxy (Step-By-Steps for Nginx and Apache),” WordPress Development, https://kinsta.com/blog/reverse-proxy/, Jan. 9, 2024, 34 pages.

TS Plus, Remote Access, “Reverse Proxy,” retrieved from https://docs.dl-files.com/tsplus/farm-reverse-proxy, on Feb. 12, 2024, 5 pages.

Watchguard, “Reverse Proxy for the Access Portal,” Help Center, retrieved from https://www.watchguard.com/help/docs/help-center/en-US/Content/en-US/Fireware/services/access%20portal/access_portal_reverse-proxy.html, on Feb. 12, 2024, 4 pages.

* cited by examiner

200

TRANSITIVELY AUTHENTICATED REVERSE PROXY

CROSS-REFERENCE TO RELATED APPLICATION

This application claims the benefit of priority under 35 U.S.C. § 119(e) to U.S. Provisional Application No. 63/587,765, filed on Oct. 4, 2023, which is hereby incorporated by reference in its entirety.

TECHNICAL FIELD

The present disclosure relates to computer networking, data management, and data communications.

BACKGROUND

For certain applications, specifically for troubleshooting enterprise networks, users frequently connect to web interfaces to collect data from devices of an enterprise network. Assuming users, such as network engineers, have network connectivity to the remote enterprise network, to troubleshoot enterprise devices, users use credentials to authenticate and access these enterprise devices. Obtaining access to an enterprise network, however, may be challenging. Users need to be physically present at an enterprise site or use a virtual private network (VPN) to access the enterprise network. Both access techniques may be impractical and pose security-related concerns. Screen sharing may be another form of remote access, but it ties up the device whose screen is being shared, is less responsive, and prevents direct uploading/downloading of files to and from the remote device, such as support bundles, data logs, diagnostics data, and software updates. Moreover, enterprises may be reluctant to share their credentials, and it is cumbersome to create a new set of credentials for every device that needs troubleshooting, i.e., one for every device/user combination.

DESCRIPTION OF EXAMPLE EMBODIMENTS

Overview

Figure 1:
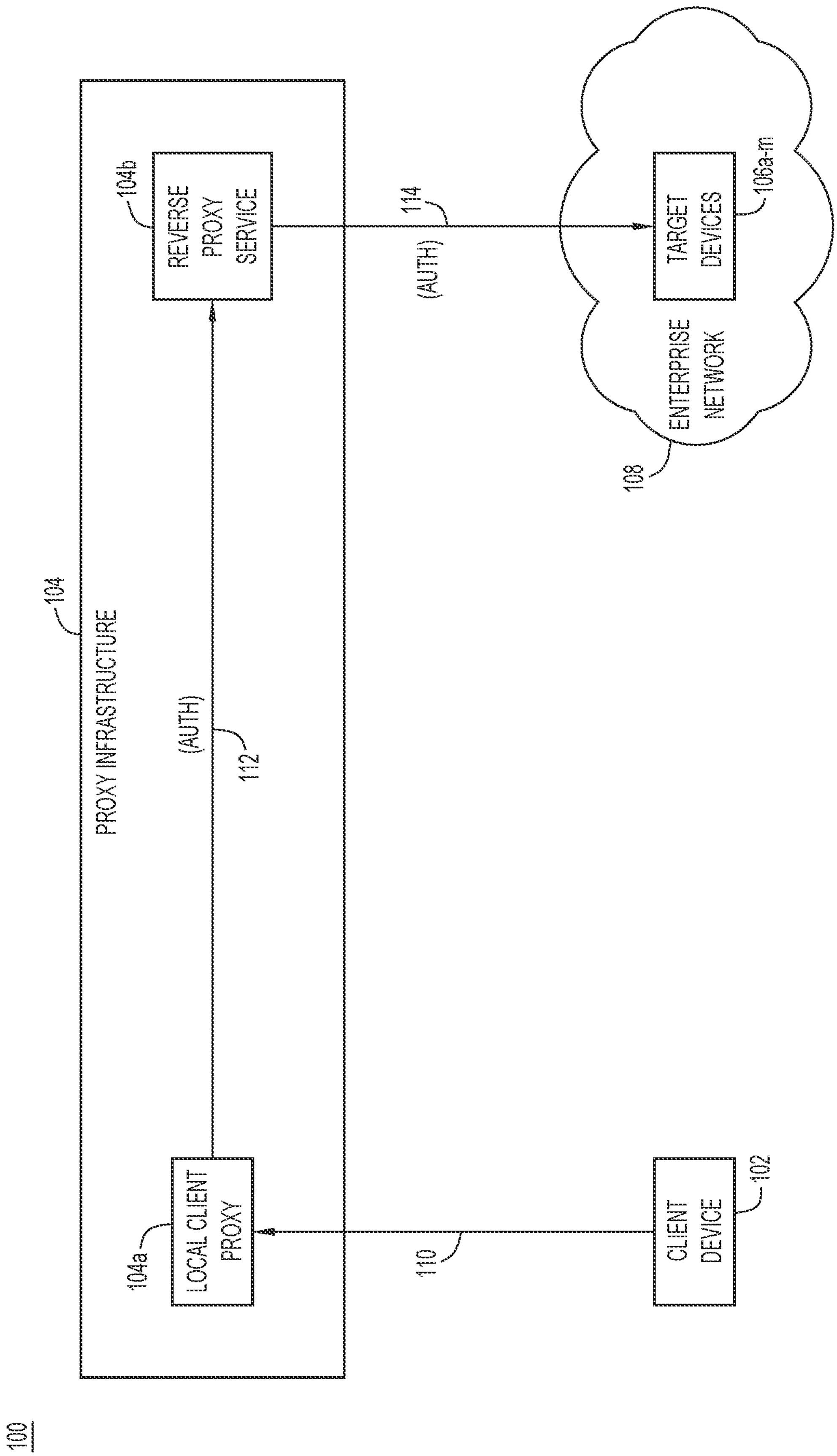
FIG. 1 is a diagram illustrating a system in which a reverse proxy service authenticates access for a remote client device to navigate to one or more target devices of an enterprise network, according to an example embodiment.

Briefly, methods are presented for providing an intermediate proxy infrastructure that is configured to authenticate a client device to navigate to one or more target devices of an enterprise network using different ways of trust. A transitively authenticated reverse proxy serves as a bridge between an enterprise network and a computing machine of a user, ensuring a chain of trust between the application, e.g., troubleshooting application and the destination, e.g., one or more network devices in an enterprise network.

In one form, a local client proxy obtains, from a client device, a request to navigate to one or more target devices of a remote enterprise network and locally authenticates the client device based on at least one of an identity of the client device and user credentials. The local client proxy further generates a connection request for the client device to navigate to the one or more target devices based on the client device being locally authenticated and provides the connection request to a proxy service executing in the remote enterprise network. The proxy service authenticates an access to the one or more target devices based on device credentials while hiding the device credentials from the client device.

In another form, a proxy service obtains, from a remote client proxy, a connection request for a remote client device to navigate to one or more target devices of an enterprise network and obtains, from a device service inventory of the enterprise network, device credentials for the one or more target devices. The proxy service authenticates an access for the remote client device to navigate to the one or more target devices based on the device credentials and provides, to the remote client proxy, a connection response for establishing a connection for the remote client device to navigate to the one or more target devices in which the device credentials are hidden.

Example Embodiments

The techniques presented herein provide a proxy infrastructure that intercepts Hyper Text Transfer Protocol (HTTP) requests between a user (engineer, troubleshooter, etc.) and devices of an enterprise network. This proxy infrastructure performs authentication (e.g., HTTP and/or application-level authentication) to the individual devices of the enterprise network and replaces it with one common technique of authenticating to the proxy infrastructure. The proxy infrastructure is a reverse proxy that allows navigation to remote devices of an enterprise network where authentication to the target devices takes place transitively, replacing it with a different authentication method. The proxy infrastructure allows usage of a web browser to navigate a set of remote devices without requiring access to the credentials for any of these devices. In other words, device credentials are hidden from a client device and the identity and user credentials of the client device and the user are hidden from the target devices. In one example embodiment, an authentication process may be hidden from the client device and not only the credentials.

In one or more example embodiments, the "navigation action" may be performed using the same native application that would be used if the target device was being accessed directly from the enterprise network i.e., no screen sharing, and without the need for any direct network connectivity to the target device. As such, the techniques may involve application-level proxying and application-level authentication. The connection request to navigate a target device may be provided to a proxy service executing in a remote enterprise network over a secure connection, including but not limited to, a dedicated cloud service.

FIG. 1 is a diagram illustrating a system 100 in which a reverse proxy service authenticates access for a remote client device to navigate to one or more target devices of an enterprise network, according to an example embodiment. The system 100 includes a client device 102, a proxy infrastructure 104, and target devices 106*a-m* of an enterprise network 108. The proxy infrastructure 104 includes a local client proxy 104*a* for the client device 102 and a reverse proxy service 104*b* that runs within the enterprise network 108.

The notations 1, 2, 3 . . . n; a, b, c, . . . n; "a-n", "a-d", "a-f", "a-g", "a-k", "a-c", and the like illustrate that the number of elements can vary depending on a particular implementation and is not limited to the number of elements being depicted or described. Moreover, this is only an example of various components, and the number and types of components, functions, etc. may vary based on a particular deployment and use case scenario.

The client device 102 executes an application programming interface (API) client or a web browser. The client device 102 is a console, an endpoint, or a user device. The client device 102 includes a user interface (e.g., a keyboard) configured to obtain command input from an operator or a user. Additionally, the client device 102 is configured to provide command output to the operator (e.g., via a display). For example, the client device 102 may be a personal computer, laptop, tablet, and so on. The client device 102 is an apparatus (such as the computing device of FIG. 5) that includes a memory, a processor, and a network interface.

The client device 102 communicates with and/or configures one or more of the target devices 106*a-m*, via the proxy infrastructure 104. The client device 102 requests data and/or action(s) from the target devices 106*a-m* by providing commands and obtains data or results from these target devices 106*a-m* as the command output, for example. Users (e.g., operators and/or network engineers) that belong to one enterprise may perform network management and troubleshooting of target devices 106*a-m* of other enterprises without sharing access credentials between enterprises and without creating a new set of credentials for the target device/user combination. That is, the device credentials of the target devices 106*a-m* are hidden from the client device 102 and user credentials and identity of the client device 102 are hidden from the other enterprises (the target devices 106*a-m*). In one example embodiment, the credentials used to authenticate the client device 102 may depend on the identity of the user. Further, the identity of the user may be unknown to the reverse proxy service 104*b*.

In one example embodiment, operators use the client device 102 to resolve network issues and/or open cases, e.g., errors or issues to troubleshoot on the target devices 106*a-m* of other enterprises. Network issues may involve network related problems or other potential problems. For example, network related problems may be an outage, a latency problem, a connectivity problem, a malfunction of the network device or software thereon, and/or incompatibility or configuration related problems. Other potential problems may involve defects, obsolescence, configurations, workarounds, network patches, network information, etc. As another example, network issues may relate to warranties, licenses, security vulnerabilities, or may be informational notices, e.g., for a particular configuration, upgrade, or a report.

The operators use the client device 102 to change one or more configurations of target devices 106*a-m* of other enterprises. In one or more example embodiments, users use the client device 102 to perform network management, such as resolving network related issues (a ticketing task), solving a security related vulnerability (security resolution task), providing technical information or asset details (technical reporting and briefing task), and/or installing one or more network features (e.g., enabling a particular feature on a group of network devices of an enterprise network). Some other non-limiting examples may include changing configurations of access policies, security and firewall protection services, software image management, endpoint or user device protection of the assets of an enterprise network, network segmentation and configuration, software defined network (SDN) management, data storage services, data backup services, data restoration services, voice over internet (VoIP) services, managing traffic flows, analytics services (collecting telemetry data), etc. The user may change the configuration of the one or more affected network devices in the enterprise network by establishing a secure (end-to-end encrypted) connection with each of the one or more affected network devices using the proxy infrastructure 104 and reconfiguring a hardware or a firmware on a respective network device.

Target devices 106*a-m* are assets or resources of the enterprise network 108. Target devices 106*a-m* include network/computing equipment and software. The network/computing equipment and software may include any type of network devices or network nodes, such as controllers, access points, gateways, switches, routers, hubs, bridges, gateways, modems, firewalls, intrusion protection devices/software, repeaters, servers, and so on. The network/computing equipment and software may further include endpoint or user devices, such as a personal computer, laptop, tablet, and so on. The network/computing equipment and software may include virtual nodes such as virtual machines, containers, point of delivery (PoD), and software, such as system software (operating systems), firmware, security software such as firewalls, and other software products. The network/computing equipment and software may be in a form of software products that reside in an enterprise network and/or in one or more cloud(s). Associated with the network/computing equipment and software is configuration data representing various configurations, such as enabled and disabled features. The network/computing equipment and software, located at the enterprise sites, represent an information technology (IT) environment of an enterprise.

The enterprise sites may be physical locations such as one or more data centers, facilities, or buildings located across geographic areas that are designated to host the network/computing equipment and software. The enterprise sites may further include one or more virtual data centers, which are a pool or a collection of cloud-based infrastructure resources specifically designed for enterprise intents, and/or for cloud-based service provider intent. While in FIG. 1, target devices 106*a-m* are depicted as belonging to one enterprise, this is just an example. Target devices 106*a-m* may belong to various enterprises and/or may be located on different enterprise sites, depending on a particular deployment and use case scenario.

The proxy infrastructure 104 is configured to intercept requests, e.g., HTTP requests, between a user of the client device 102 and target devices 106*a-m* of the enterprise network 108. The proxy infrastructure 104 performs authentication to individual devices of the enterprise network 108 and replaces it with one common technique of authenticating to the proxy infrastructure 104. The proxy infrastructure 104 includes the local client proxy 104*a* and the reverse proxy service 104*b*. Each of the local client proxy 104*a* and the reverse proxy service 104*b* may be executed by an apparatus such as the one described in FIG. 7 or may be distributed among multiple servers or executed in a cloud.

The local client proxy 104*a* is a client component, running in a user network that is to navigate to the target devices 106*a-m*. The client component opens a connection to the reverse proxy service 104*b*, through which the client device 102 connects to the target devices 106*a-m*. An HTTP request to any of the exposed devices (target devices 106*a-m*) may be performed through the client component (the local client proxy 104*a*).

In one or more example embodiments, the local client proxy 104*a* may act as an HTTP proxy or Socket Secure protocol (SOCKS) version 5 (v5) proxy that is used by the client device 102 (or any API user device) to configure a remote enterprise network (i.e., the target devices 106*a-m* of the enterprise network 108). This allows use of the client device 102 to navigate to a network of another enterprise without performing authentication flows specific to each remote device (the authentication flows to the remote device are handled within the reverse proxy service 104*b*). The device credentials are hidden from the local client proxy 104*a* such that device credentials are not shared with an enterprise of the client device 102.

While one or more example embodiments describe the local client proxy 104*a* being an HTTP or a SOCKS proxy, these are just examples. The local client proxy 104*a* may be deployed using other protocols that are configured to interface with the client device 102 and the network. The protocol used to deploy the local client proxy 104*a* depends on a particular deployment and use case scenario. While the local client proxy 104*a* is depicted as a separate component, in one example embodiment, the local client proxy 104*a* may be integrated onto the client device 102. The local client proxy 104*a* is configured to authenticate the client device 102 and the user using user credentials and/or identity of the client device 102. The local client proxy 104*a* does not share user credentials and the identity of the client device 102 with the reverse proxy service 104*b*. In other words, the user credentials and the identity of the client device 102 are hidden from the enterprise network 108.

The reverse proxy service 104*b* is associated with the enterprise network 108 and may execute within the enterprise network 108, described with reference to FIG. 2. The reverse proxy service 104*b* keeps track of a device inventory with authentication information. That is, the reverse proxy service 104*b* includes or accesses an inventory of target devices 106*a-m* including the required information for authenticating to the target devices 106*a-m* (usernames/passwords/private keys, etc.). The reverse proxy service 104*b* may run within the enterprise network 108 that is exposed and can establish connections to the target devices 106*a-m*. For example, devices' credentials are stored in an encrypted database. The reverse proxy service 104*b* implements different authentication/login flows for connecting to different types of the target devices 106*a-m* in the inventory using the credentials from the inventory.

The reverse proxy service 104*b* may optionally include a database that stores inventory data for the devices 106*a-m* of the enterprise network. The reverse proxy service 104*b* may be executed on a configuration server or a controller that configures and manages the target devices 106*a-m*. The reverse proxy service 104*b* may be implemented by any combination of any quantity of software (and/or hardware modules or units) and may reside within memory of a configuration server for execution by a processor.

In one example embodiment, the end-to-end flow may be as follows:

[web browser from user]→[local client proxy]→ . . . →[reverse proxy service]→[target devices]

Specifically, at 110, a user (e.g., an engineer) uses the client device 102 to open a web browser. The client device 102 executes a local Socket Secure (SOCKS) proxy or an HTTP proxy (e.g., the local client proxy 104*a*) that is used by the web browser for any outgoing HTTP requests. The local client proxy 104*a* exposes a direct web access to the remote devices (target devices 106*a-m*) of the enterprise network 108.

That is, the local client proxy 104*a*, executing on a client side (e.g., a local proxy server), decodes incoming requests from the web browser of the client device 102. Decoding may involve executing a SOCKS handshake, termination of the Transport Layer Security (TLS) stream from the browser (for HTTPS requests), and interpreting the HTTP/1.1 or HTTP/2 traffic and web socket traffic. The local client proxy 104*a* extracts information from each HTTP request (method/headers/body/ . . . ) to translate the request into a remote procedure call (RPC) protocol call to provide to the reverse proxy service 104*b*.

The information in the HTTP request may include a domain name, the identity of a service or an enterprise network, and/or target device(s). In one example embodiment, the local client proxy 104*a* decodes fully qualified domain names (FQDNs) in the "<device_id>.<service_id>.http.proxy" format to determine which service/device the request is to be routed to. The local client proxy 104*a* determines the enterprise network 108 (e.g., an enterprise 1) and a target device (e.g., device 1) based on the FQDN. As an example, the device_id may be a unique identifier of a target device, e.g., a variable; the service_id may be another unique identifier specific to the service (enterprise 1), e.g., also a variable, and the http-.proxy is a fixed suffix. Based on analyzing the FQDNs, a whole network of devices (the target devices 106*a-m*) are exposed through the local client proxy 104*a*. A Transport Layer Security (TLS) stream should be terminated in the local client proxy 104*a* because web front-end code that is served by the client device often assumes an https://URL. Further, TLS is also required for HTTP/2 by web browsers. The TLS stream, however, is only local between the web browser of the client device 102 and the local client proxy 104*a* and may use a self-signed certificate.

Based on authenticating the user (i.e., user credentials) and the client device 102 (i.e., the identity of the client device 102), the local client proxy 104*a* generates an RPC request or a connection request to access a target device of the enterprise network 108.

At 112, the RPC request is forwarded to the reverse proxy service 104*b* for authenticating access to one or more of the target devices 106*a*-*m*. The RPC protocol is just one example of a way to communicate between the local client proxy 104*a* and the reverse proxy service 104*b* and the disclosure is not limited thereto. The RPC request does not share (excludes) the identity of the client device 102 and the user credentials. In other words, information about the user and the client device 102 is hidden from the reverse proxy service 104*b*. Instead, the RPC request includes other relevant information from the original HTTP request such as an identification of the targeted devices 106*a*-*m* of the enterprise network 108 for which access is to be authenticated. For example, the outermost protocol includes a hostname of a target device to be accessed. The RPC request may also be encrypted.

As noted above, while the TLS protocol may be used for some web sites that need it to function, it is terminated with a self-signed certificate at the local client proxy 104*a*. As such, the RPC request includes information from the original HTTP request and other information for authentication such as cookies. The TLS certificate from the client device 102 is not presented (it is the client device 102 that owns the TLS certificate) and the TLS stream terminates at local client proxy 104*a*; an end-to-end TLS stream is not provided because the proxy infrastructure 104 (the local client proxy 104*a* and the reverse proxy service 104*b*) intercepts the traffic, and the reverse proxy service 104*b* performs access authentication to navigate to the target devices 106*a*-*m*.

At 114, the reverse proxy service 104*b* authenticates access to the one or more target devices 106*a*-*m* using device specific authentication methods. That is, the target devices 106*a*-*m* may use different authentication flows for each device type. As an example, for a switch running an operating system A, the authentication flow may be a basic HTTP authentication or a transport layer security (TLS) certificate-based authentication and for a router running an operating system B, the authentication flow may be an application-level authentication involving username/password, bearer tokens or JavaScript Object Notation (JSON) web tokens (JWTs). As such, the reverse proxy service 104*b* obtains device credentials such as an authentication method and/or authentication information. The device credentials may be stored in an encrypted database. In one example embodiment, an authentication/login flow may involve obtaining tokens/cookies/etc. and using these items for every consecutive request. Sometimes, the reverse proxy service 104*b* injects a basic authentication header. As such, actual device credentials are maintained within the enterprise network 108 and the authentication flow is handled within the enterprise network 108, for security reasons.

In one or more example embodiments, the reverse proxy service 104*b* ensures that the authentication of outgoing requests to any of the target devices 106*a*-*m* takes place and replaces it with authentication of its own. The client authenticates with the proxy infrastructure 104 (rather than the target devices 106*a*-*m*). This way, the client device 102 does not have access to any of the device credentials of the target devices 106*a*-*m*. The device credentials are not shared outside of the enterprise network 108. The reverse proxy service 104*b* may replace a session token for access to a target device with a fake session token and provide the fake session token in a connection response to the local client proxy 104*a*. A fake token may be beneficial because front-end/user-interface code downloaded from the client device 102 and running in a browser of the client device 102 expects session credentials to be present (e.g., a JWT token that includes information about the remaining session time). Also, many applications also rely on cross-site request forgery (CSRF) prevention, which causes the browser-side code to repeat session data back to the client device 102. As such, session credentials may not simply be omitted from the response and are replaced with fake values of a similar format. In short, the reverse proxy service 104*b* accepts incoming remote procedure call (RPC) requests for performing HTTP requests to any of the target devices 106*a*-*m* in the enterprise network 108. For such an incoming RPC request, the reverse proxy service 104*b* executes the authentication/login flow of a target device and then performs the actual request. The incoming RPC requests are thus authenticated.

Figure 2:
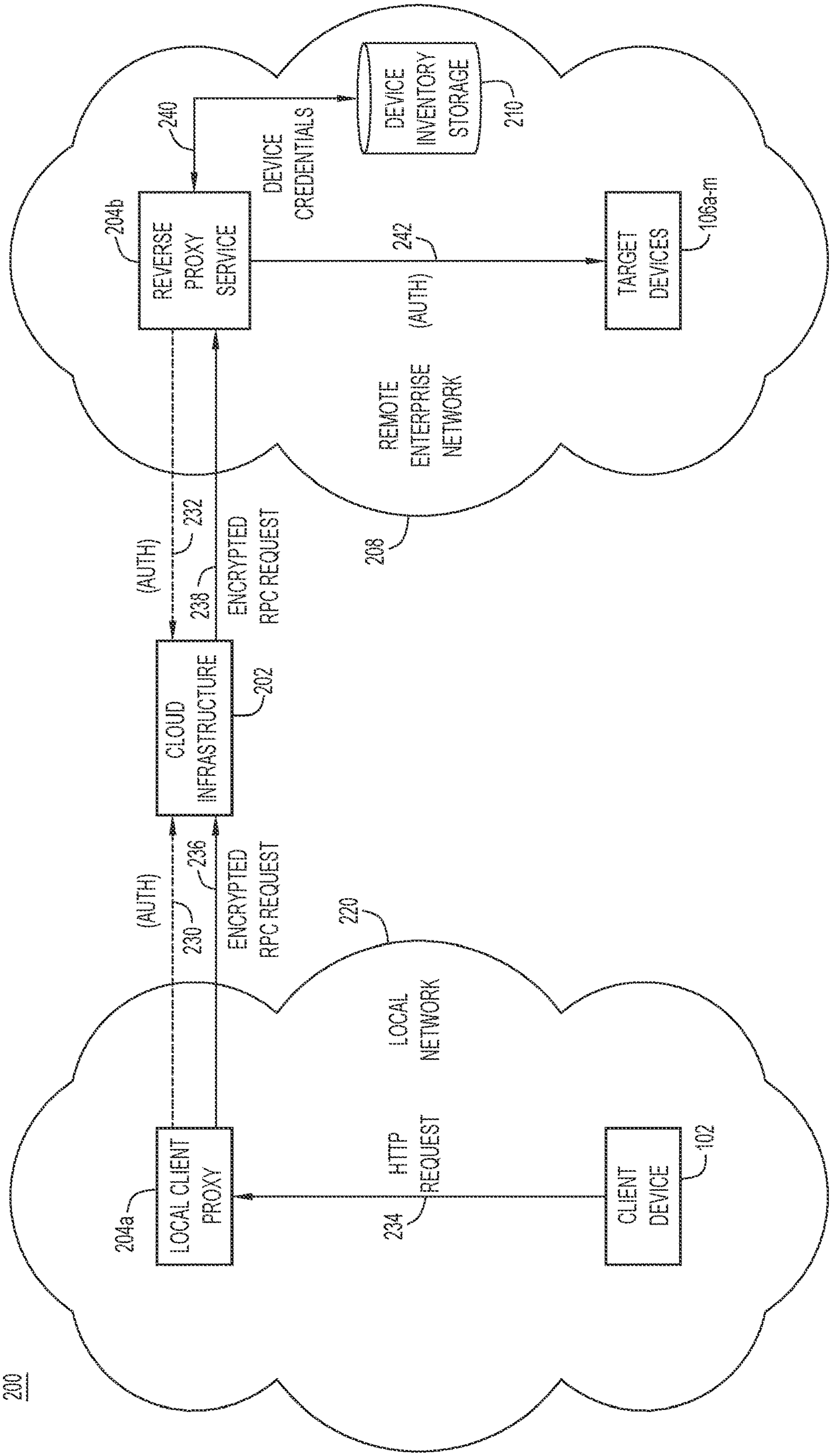
FIG. 2 is a diagram illustrating a system in which a cloud infrastructure is interposed between a local client proxy and a reverse proxy service for a cloud-based authentication of a client device and target devices of an enterprise network, according to an example embodiment.

In one or more example embodiments, the proxy infrastructure 104 may expose target devices 106*a*-*m* through a cloud, for example in case the enterprise network 108 does not allow incoming connections due to firewall limitations, as detailed in FIG. 2.

With continued reference to FIG. 1, FIG. 2 is a diagram illustrating a system 200 in which a cloud infrastructure 202 is interposed between a local client proxy and a reverse proxy service for a cloud-based authentication of a client device and target devices of an enterprise network, according to an example embodiment. The system 200 includes the client device 102, a local client proxy 204*a* (which is similar to the local client proxy 104*a*) in a local network 220 connected to a reverse proxy service 204*b* (which is similar to a reverse proxy service 104*b*) via the cloud infrastructure 202. The reverse proxy service 204*b* is part of a remote enterprise network 208 and obtains device credentials of the target devices 106*a*-*m* from a device inventory storage 210.

In the system 200, the reverse proxy service 204*b* exposes the target devices 106*a*-*m* (RPC endpoints), through the cloud infrastructure 202, e.g., when the remote enterprise network 208 does not allow incoming connections due to firewall configurations. In the system 200, any kind of cloud based authentication may be used. Using the local client proxy 204*a*, rather than running the HTTP/SOCKS proxy within the remote service, is beneficial because it allows for complex authentication flows between a client and a service (flows that are not supported by the HTTP or SOCKS proxy protocols) and because it allows for complex connection routing between the client and the service when traffic is not directly routable from the local network 220 of the client device 102 to the remote enterprise network 208.

The cloud infrastructure 202 is configured to connect the local client proxy 204*a* and the reverse proxy service 204*b*. The reverse proxy service 204*b* establishes an outgoing connection to the cloud infrastructure 202 to traverse firewalls. In this setup, having an HTTP proxy connection being terminated in the local client (the local network 220) allows for an end-to-end encryption from local to remote (the remote enterprise network 208) without having the cloud infrastructure 202 being able to introspect traffic.

In the system 200, the client device 102 has access to the remote enterprise network 208 of target devices 106*a*-*m* but authenticates to the local client proxy 204*a* (or cloud infrastructure 202 as another example), rather than the target devices 106*a*-*m* themselves, and the reverse proxy service 204*b* is trusting incoming connections from the cloud infrastructure 202 and authenticates access to the target devices 106*a*-*m* (determining authentication method and device credentials). After the client is authenticated, the client starts a proxy server to expose the remote enterprise network 208. The client device 102 is configured to use a local proxy server to navigate to any of the remote devices (target devices 106*a*-*m*) without requiring authentication.

The device inventory storage 210 may be running on the remote enterprise network 208. The device inventory storage 210 is configured to store device inventory with authentication information such as an authentication method to use and device credentials. The device inventory storage 210 may be an encrypted database. For example, the device inventory storage 210 may store keys or security tokens for generating session tokens, cookies, etc.

In the system 200, at 230, the local client proxy 204*a* authenticates the client device 102 onto the cloud infrastructure 202. At 232, the reverse proxy service 204*b* also authenticates with the cloud infrastructure 202. In other words, the reverse proxy service 204*b* establishes an outgoing trusted connection to the cloud infrastructure 202 e.g., to traverse firewalls. The reverse proxy service 204*b* is configured to accept access requests from the cloud infrastructure 202. Based on the established authenticated connections to the cloud infrastructure 202, end-to-end encryption is ensured from the local network 220 to the remote enterprise network 208 without the cloud infrastructure 202 introspecting traffic.

At 234, the client device 102 generates an HTTP request to one of the target devices 106*a-m*, e.g., collect telemetry data for a traffic flow X. The HTTP request is intercepted by the local client proxy 204*a*. A transport layer security (TLS) stream (the HTTP request) should be terminated in the local client proxy 204*a* because web front-end code that is served by devices often assumes an https:// URL. Further TLS is also required for HTTP/2 by web browsers. The TLS stream, however, is only local between the client device 102 and local client proxy 204*a* and may use a self-signed certificate. The TLS certificate from the client device 102 cannot be presented (it is the client device 102 that owns the TLS certificate) nor can it be possible, because the reverse proxy service 204*b* intercepts the traffic and performs the authentication. The TLS certificate is excluded from the request to the reverse proxy service 204*b*.

Specifically, the local client proxy 204*a* decodes received request e.g., decoding a fully qualified domain name in a "<device_id>.<service_id>.http.proxy" format. The decoding process may involve a SOCKS handshake; a termination of the TLS stream and an interpretation of the HTTP/1.1 or HTTP/2 traffic and/or web socket traffic. The local client proxy 204*a* further extracts information from the HTTP request such as user credentials and client device identity and generates an RPC request that excludes the user credentials and the client device identity. The RPC request includes information to identify the enterprise network 108 and encrypts the target device information and other information in the RPC request.

At 236, the encrypted RPC request is provided to the cloud infrastructure 202. The cloud infrastructure 202 does not decrypt the request, and based on the identity of the enterprise network 108, forwards the RPC request to the reverse proxy service 204*b*, at 238. The reverse proxy service 204*b* decrypts the RPC request and determines the target device. The user credentials and the client device identity are excluded from the RPC request.

At 240, the reverse proxy service 204*b* retrieves device credentials such as an authentication method and security information (token, keys, etc.) from the device inventory storage 210.

At 242, the reverse proxy service 204*b* authenticates access to the target device based on the retrieved device credentials. Assuming that the target devices 106*a-m* are exposing HTTPS (encrypted) connections, the reverse proxy service 204*b* terminates the HTTPS connections to the target devices 106*a-m* to authenticate access to the target devices 106*a-m*. As noted above, the client device 102 cannot terminate the TLS stream to the target devices 106*a-m*; however, the client device 102 requires HTTPS traffic for many web sites to function. (Especially when web sockets are required, the web socket URL is built from the FQDN, but using wss:// as a protocol, which uses HTTPS). As such, the local client proxy 204*a* exposes both HTTP and HTTPS web sites for all remote devices and terminates the protocols. The local client proxy 104*a* does not view any credentials of the target devices 106*a-m*, such as cookies that are returned by respective devices. The reverse proxy service 204*b* strips/removes and/or replaces the cookies for security i.e., the device credentials are excluded from responses to the client device 102. For example, the reverse proxy service 204*b* may replace a session token with a respective target device with a fake session token when forwarding the response to the local client proxy 204*a* via the cloud infrastructure 202, as detailed in FIG. 3.

Figure 3:
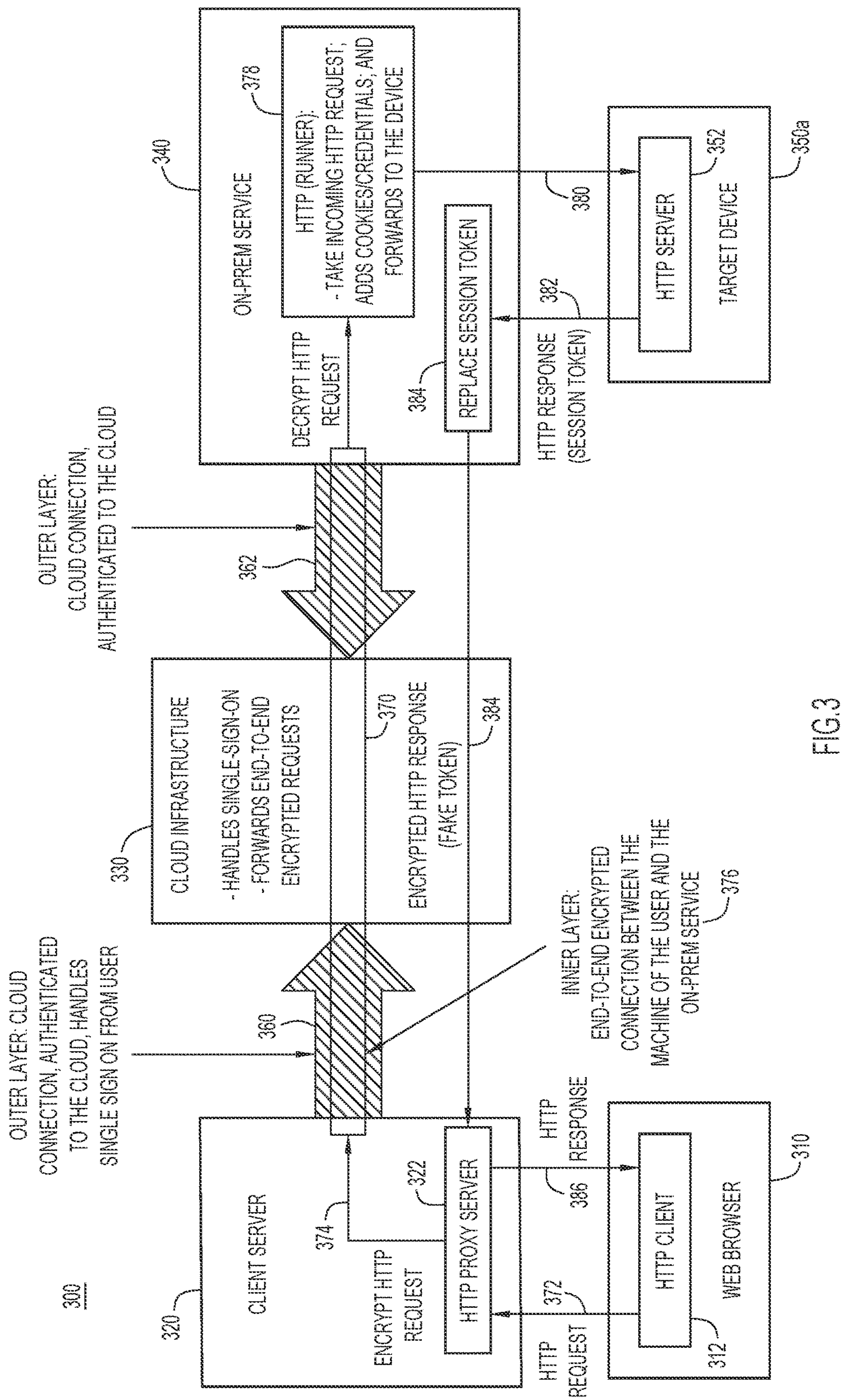
FIG. 3 is a diagram illustrating an environment in which a cloud infrastructure handles authentication and forwards end-to-end encrypted data traffic between a local client proxy and a reverse proxy service, according to an example embodiment.

With continued reference to FIGS. 1 and 2, FIG. 3 is a diagram illustrating an environment 300 in which a cloud infrastructure 330 handles authentication and forwards end-to-end encrypted data traffic between a local client proxy and a reverse proxy service, according to an example embodiment. The environment 300 includes a web browser 310, a client server 320, the cloud infrastructure 330, an on-premise reverse proxy service (an on-prem service 340), and a target device 350*a*. The cloud infrastructure 330 is configured to perform authentication such as a single sign-on (SSO) or a certificate-based authentication but does not view the data traffic to and from target devices due to end-to-end encryption.

Specifically, in the environment 300, the web browser 310 includes an HTTP client 312 that connects to an HTTP proxy server 322 of the client server 320. One example of the client server 320 may be a software development kit (SDK) for interacting with remote equipment. The web browser 310 and the client server 320 may be running on the same endpoint, such as the client device 102 of FIGS. 1 and 2. The cloud infrastructure 330 may be similar to the cloud infrastructure 202 of FIG. 2. The on-prem service 340 may be an SDK service running in an enterprise network (not shown) that authenticates access to the target device 350*a* and handles requests to the target device 350*a*. The on-prem service 340 may be similar to the reverse proxy service 104*b*/204*b* of FIGS. 1 and 2. The target device 350*a* may be a network device of an enterprise network, such as a router, that includes an HTTP server 352 for handling HTTP requests and HTTP responses.

The environment 300 is just one example, and the disclosure is not limited to HTTP. Other protocols may be deployed according to a particular environment and use case scenario e.g., any TCP based protocols are within the scope of the disclosure.

In the environment 300, at an outer layer (shown at 360 and 362), authentication of the web browser 310 and the on-prem service 340 is performed. At 360, the authentication may involve connecting the client server 320 to the cloud infrastructure 330 and performing a single sign on (SSO) or a certificate and a private key of a user via the web browser 310, e.g., the user inputs a username and password. At 362, the authentication may involve connecting the on-prem service 340 to the cloud infrastructure 330 and authenticating the on-prem service 340 to the cloud infrastructure 330, e.g., also using SSO or a certificate and a private key.

At an inner layer illustrated at 370, the data traffic is end-to-end encrypted, such that the cloud infrastructure 330 simply forwards the encrypted requests and cannot view the content thereof. Based on a first encryption between the web browser 310 and the client server 320, a second encryption between the client server 320 and the on-prem service 340, and a third encryption between the on-prem service 340 and the target device 350*a*, end-to-end encryption is achieved. That is, the user navigates to the target device 350*a* via the web browser 310 with a complete end-to-end encryption without sharing any credentials between the client side and the network enterprise side. For example, an engineer may troubleshoot the target device 350*a*, e.g., collect telemetry or reconfigure a port of the target device 350*a*, with the device credentials being hidden from the client side.

Specifically, the web browser 310 obtains user input and generates an HTTP request. At 372, the HTTP request is transmitted onto a network. The incoming HTTP request is intercepted by the client server 320 using a local forward proxy (e.g., HTTP proxy or SOCKS proxy) on a client device. The local forward proxy may be running next to the web browser 310.

The HTTP proxy server 322 of the client server 320 encrypts the outgoing RPC requests to achieve an end-to-end encryption. The encrypted incoming/intercepted HTTP request (encrypted as the outgoing RPC request) is then transmitted to the cloud infrastructure 330, at 374. That is, the client server 320 connects to the cloud infrastructure 330, which authenticates the encrypted request using cloud based SSO. The cloud credentials are outside the encrypted envelope that goes to the on-prem service 340, at 376. The cloud infrastructure 330 does not and cannot interpret or view the encrypted request. The cloud infrastructure 330 is prevented from accessing data or content in the request and simply forwards the request to the on-prem service 340.

At 378, the on-prem service 340 decrypts the encrypted request (e.g., end-to-end encryption (E2EE) decapsulation from the client server 320 to the on-prem service 340). Based on the decrypted request, the target device 350*a* is determined. The on-prem service 340 obtains device credentials such as cookies or tokens, and at 380, forwards the request with the added device credentials to an HTTP server 352 of the target device 350*a*. Access to the target device 350*a* is authenticated using locally configured credentials that are not shared outside of the enterprise network (the on-prem service 340). The target devices are unmodified and are not designed to support SSO, e.g., they do not support custom cloud based authentication flows. The reverse proxy service 104*b* is configured to perform different authentication flows for different target devices.

The HTTP server 352 of the target device 350*a* may generate a response and at 382, provide the encrypted response to the on-prem service 340. For example, the encrypted HTTP response includes a session token. At 384, the on-prem service 340 replaces the session token with a fake token, thus hiding or excluding the device credentials from the response. The on-prem service 340 then encrypts the HTTP response that already includes the fake token, for transmission to the client server 320 via the cloud infrastructure 330. The HTTP proxy server 322 decrypts the HTTP response and encrypts the response for transmission to the web browser 310. At 386, the encrypted HTTP response is provided to the web browser 310.

In one or more example embodiments, custom authentication flows may be used to present an authenticated session to the other end. That is, the cloud infrastructure 330 takes care of the authentication (e.g., SSO), but at the same time cannot view the data traffic going into target devices of an enterprise network due to end-to-end encryption. The cloud infrastructure does not know about authentication to the target devices (determined authentication method and security information). The on-prem component (e.g., the reverse proxy service), on the other hand, knows about the authentication to the target device (authentication method and device credentials), but does not know about cloud authentication from a user. For example, the on-prem service 340 does not see an authentication token from the user.

In one or more example embodiments, from a client device 102 to a local client server, a connection may be a SOCKS v5 proxy, optionally containing a TLS stream (in case of HTTPS) and/or containing an HTTP stream. The local client server does not have to but may cause its clients to authenticate e.g., with a cloud using SSO or to the local client server. Various protocols are terminated at the local client proxy (e.g., five or six protocols such as SOCKS v5 or the HTTP proxy protocol (which is also HTTP/1.1) and within them, TLS, HTTP/1.1, HTTP/2, and Web Socket (WS) protocols). For each incoming HTTP request, a call is forwarded to a reverse proxy/on-prem service. The proxy protocol (the outermost protocol) carries the hostname of a target device to reach. The TLS protocol may be used because it is used for some web sites to function but can be terminated with a self-signed certificate at the local client server.

From the local client server to the reverse proxy/on-prem service, protocol(s) used for the connection may vary depending on a particular deployment and use case scenario. The local client server generates a request in a selected protocol to transfer relevant information from an original HTTP request to the reverse proxy/on-prem service such that the request is reconstructed at the reverse proxy/on-prem service. In one example embodiment, the connection is routed through a cloud infrastructure, allowing the local client server to reach a remote network (target devices) that is not immediately routable by performing cloud-based authentication. In this case, the connection may be end-to-end encrypted. Additionally, when a local client server is connected through a cloud infrastructure, many reverse proxies/on-prem services of different enterprise networks may be exposed through the same local client server.

In one example embodiment, the reverse proxy/on-prem service may be managed by a third party allowing a service administrator to grant/deny access to one or more local proxies.

With continued reference to FIGS. 1-3, FIG. 4 is a diagram illustrating an environment 400 in which a dual proxy over cloud authenticates and establishes a secure connection between an application client and a network management service, according to an example embodiment. The environment 400 includes an application client 410, such as the web browser 310 of FIG. 3, a forward proxy 420, such as the client server 320 of FIG. 3, a forwarder cloud service 430, such as the cloud infrastructure 330 of FIG. 3, a reverse proxy 440, such as the on-prem service 340 of FIG. 3, a credentials and session storage 450, such as the device inventory storage 210 of FIG. 2, and a network management service 460, such as a target device or an application server.

While the environment 400 illustrates the network management service 460 that may be used to manage network devices of an enterprise (e.g., collect telemetry data, reconfigure a port, etc.), this is just one example. The network management service 460 may be an application service or an application server that executes instructions from an application client. The network management service 460 may be the target device 350*a* of FIG. 3. That is, the disclosure is not limited to network management services and/or target devices and may involve other services and/or applications (an application server, an HTTPS server, etc.)

In the environment 400, at 470, the application client 410 authenticates with the forward proxy 420 using a proxy protocol such that mutual proxy credentials are exchanged. At 472, application protocol is proxied where application server substitute credentials are provided to the application client 410.

The forward proxy 420 is configured to authorize and/or authenticate the application client 410 and communicate with the reverse proxy 440 using the forwarder cloud service 430 such that the source identifier is the forward proxy 420 and the destination is the reverse proxy 440. Additionally, the forward proxy 420 is configured to translate between an application protocol (app-proto.) and a proxy protocol (e.g., RPC).

At 474, the forward proxy 420 communicates with the forwarder cloud service 430 using a cloud protocol e.g., to exchange credentials (e.g., cloud service credentials are provided to the forward proxy 420 and forward proxy cloud credentials are provided to the forwarder cloud service 430).

Additionally, the cloud protocol is used to exchange credentials with the reverse proxy 440, at 476. For example, the cloud service credentials are provided to the reverse proxy 440 and the reverse proxy cloud credentials are provided to the forwarder cloud service 430. In other words, the forward proxy 420 and the reverse proxy 440 authenticate with the forwarder cloud service 430 using the cloud protocol.

When a connection between the forward proxy 420 and the reverse proxy 440 is established via the forwarder cloud service 430, the forwarder cloud service 430 is used for forwarding proxy protocol messages (RPC forwarding). For example, RPC end-to-end encryption handshake and encrypted RPC. At 478, mutual RPC credentials are exchanged between the forward proxy 420 and the reverse proxy 440 via the forwarder cloud service 430.

The reverse proxy 440 is further configured to perform translation between the RPC protocol and service specific protocol i.e., application specific protocol. The reverse proxy 440 includes a session data rewriter 442 that replaces actual session credentials (e.g., tokens, cookies, etc.) with fake credentials, thus hiding the credentials of the network management service 460 from the application client 410 when a secure session is established.

Specifically, at 480, the reverse proxy 440 obtains credentials of the network management service 460 and at 482, uses the application specific protocol to authenticate access to the network management service 460. The retrieved application credentials and the credentials of the network management service 460 are used to establish a connection via the application specific protocol. When the session is established, at 484, access by the application client 410 to the network management service 460 is obtained. Dual proxied application protocol is used for communication between the application client 410 and the network management service 460. During the established session, the session data rewriter 442 replaces actual session tokens/cookies with fake session tokens/cookies when returning responses to the application client 410.

With continued reference to FIGS. 1-4, FIG. 5 is a diagram illustrating an environment 500 in which a dual hypertext transfer protocol (HTTP) proxy over cloud authenticates an application client to navigate to a target device, according to an example embodiment.

Figure 4:
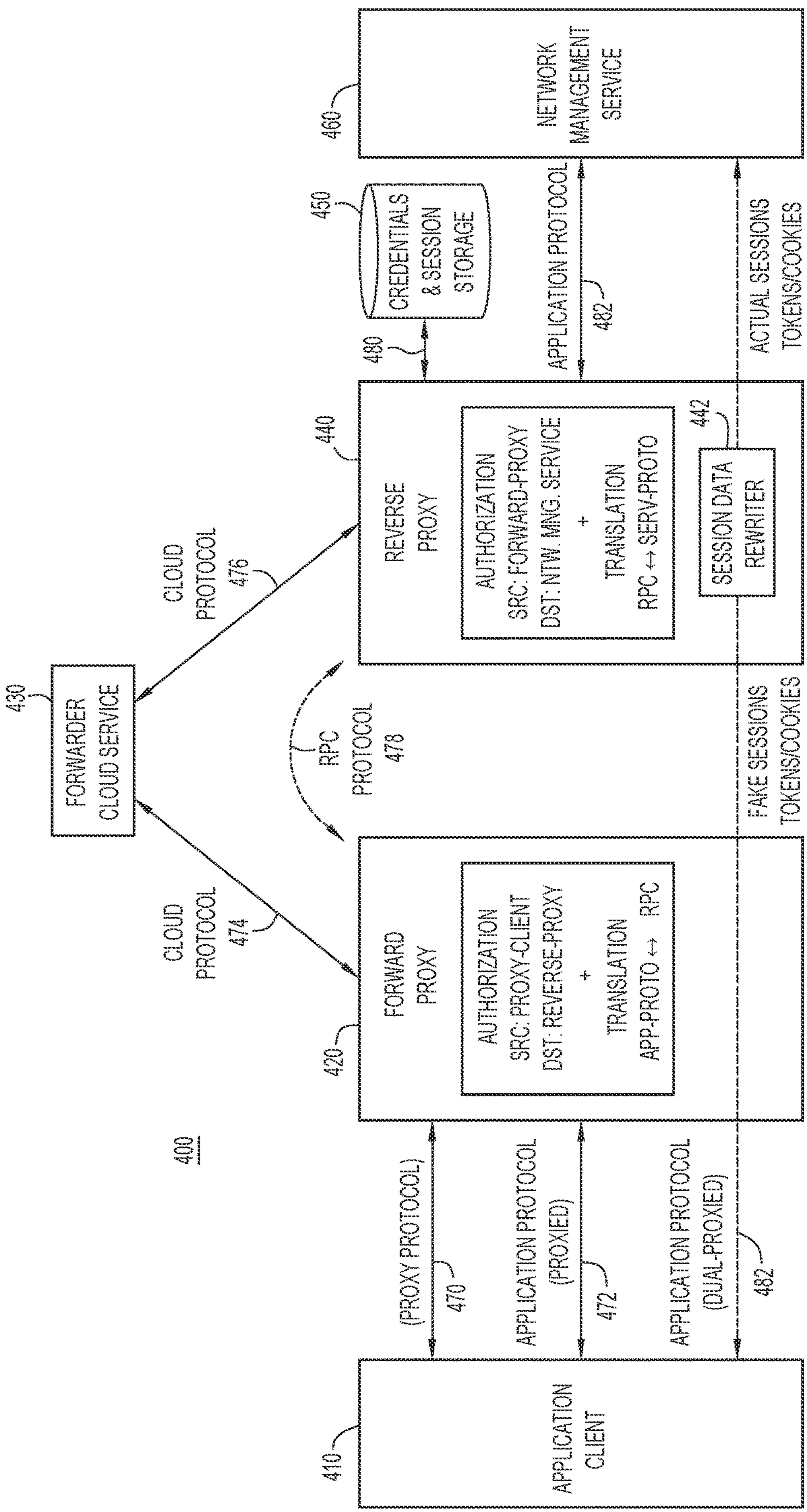
FIG. 4 is a diagram illustrating an environment in which a dual proxy over cloud authenticates and establishes a secure connection between an application client and a network management service, according to an example embodiment.

The environment 500 includes a hypertext transfer protocol secure (HTTPS) client (a browser 510) such as the web browser 310 of FIG. 3, a forward HTTP proxy 520 such as the forward proxy 420 of FIG. 4, a forwarder cloud service 530 such as the forwarder cloud service 430 of FIG. 4, a reverse proxy 540 such as the reverse proxy 440 of FIG. 4, the credentials and session storage 450 of FIG. 4, and a target device 560 such as an HTTPS server.

While the environment 500 illustrates a target device 560 as an HTTPS server, this is just one example and the disclosure is not limited thereto. By way of an example only, the reverse proxy 540 may have a uniform resource locator (URL) of https://server1.reverse1.proxy and the forward HTTP proxy 520 may have a URL of http://client1@forward1.local; further, the browser 510 may be "client 1", the forward HTTP proxy 520 may be "forward1", the reverse proxy 540 may be "reverse1", and the target device 560 may be "server1".

The browser 510 authenticates to the forward HTTP proxy 520 (forward 1) only. The credentials of the browser 510 are not known to the target device 560 and/or are not needed to navigate the target device 560. The requests/responses between the browser 510 and the forward HTTP proxy 520 are TLS-encrypted, where the forward HTTP proxy 520 (forward1) presents a TLS certificate posing as server1.reverse1.proxy. That is, an HTTPS request from the browser 510 to URL https://server1.reverse1.proxy is proxied over an HTTP connect via http://client1@forward1.local, at 570.

The forward HTTP proxy 520 intercepts requests/responses from the browser 510 (where the source is client1 and the destination is reverse1) and translates the requests/responses from HTTP to RPC protocol. That is, at 572, the RPC carrying HTTP requests/responses between the browser 510 (client1) and the target device 560 (server1) are transmitted via the forwarder cloud service 530 from the forward HTTP proxy 520 to the reverse proxy 540. The RPC carrying HTTP requests/responses are TLS-encrypted between the forward HTTP proxy 520 and the reverse proxy 540 (such that the forwarder cloud service 530 cannot inspect and serves as a forwarder only). The forward HTTP proxy 520 and the reverse proxy 540 are authenticated with the forwarder cloud service 530 to use the forwarder cloud service 530 as a forwarder.

The RPC carrying HTTP requests/responses is received by reverse proxy 540 where the source is forward1 (the forward HTTP proxy 520) and the destination is server1 (the target device 560). The reverse proxy 540 translates the RPC to HTTP, obtains credentials of the target device 560 from the credentials and session storage 450 and at 574, transmits an HTTPS request/response from the reverse1 (the reverse proxy 540) to https://server1.remote. That is, the reverse proxy 540 authenticates to the target device 560 using credentials fetched from the credentials and session storage 450. The identity of the browser 510 (client1) is unknown and/or not needed. The HTTPS requests/responses are TLS-encrypted between the reverse proxy 540 and the target device 560. However, the session cookies are hidden from the browser 510 using the session data rewriter 442.

In various example embodiments, the entities in FIGS. 1-5 may each include a network interface, at least one processor, and a memory. Each entity may be any programmable electronic device capable of executing computer readable program instructions. The network interface may include one or more network interface cards that enable components of the entity to send and receive data over the one or more networks. Each entity may include internal and external hardware components such as those depicted and described in further detail in FIG. 7. The entities (nodes, network devices, computing devices, servers of a proxy infrastructure, etc.) communicate via one or more networks.

The one or more networks may include a local area network (LAN), a wide area network (WAN) such as the Internet, or a combination thereof, and includes wired, wireless, or fiber optic connections. In general, the one or more networks can use any combination of connections and protocols that support communications between the entities.

According to one or more example embodiments, a proxy infrastructure allows users (e.g., remote helpdesk engineers) to interact with a web user interface (UI) from a device in a remote network without knowing the credentials of individual devices. The user executes a local proxy process and uses the local proxy process to authenticate to a remote service, possibly through a cloud infrastructure. The proxy infrastructure involves at least two components configured to work together such as a local proxy that executes alongside the web browser of a user and a reverse proxy service that executes within an enterprise network for authenticating access to navigate target devices of an enterprise network.

The techniques presented herein provide a proxy infrastructure that authenticates a user (using a web user interface) to remote devices of a remote enterprise network and thus replace individual, device specific authentications with one common method of authenticating to the proxy infrastructure. In these techniques, user credentials and client device identity are hidden from the remote enterprise network and device credentials are hidden from the client device in the local network. Since credentials need not be shared, security of the enterprise network is improved. Further, no new set of credentials need to be generated for each device/engineer combination.

Figure 5:
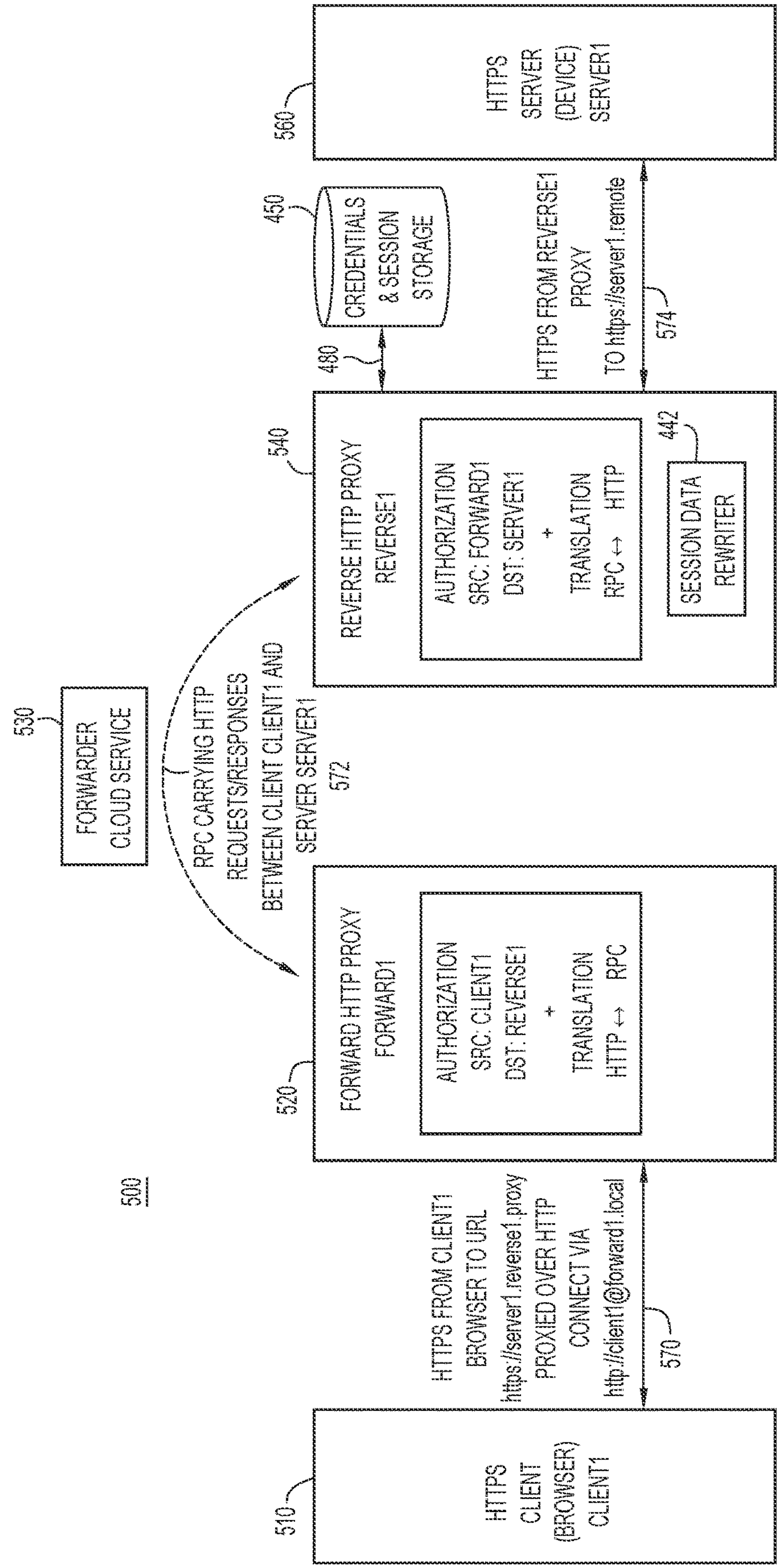
FIG. 5 is a diagram illustrating an environment in which a dual hypertext transfer protocol (HTTP) proxy over cloud authenticates an application client to navigate to a target device, according to an example embodiment.
Figure 6A:
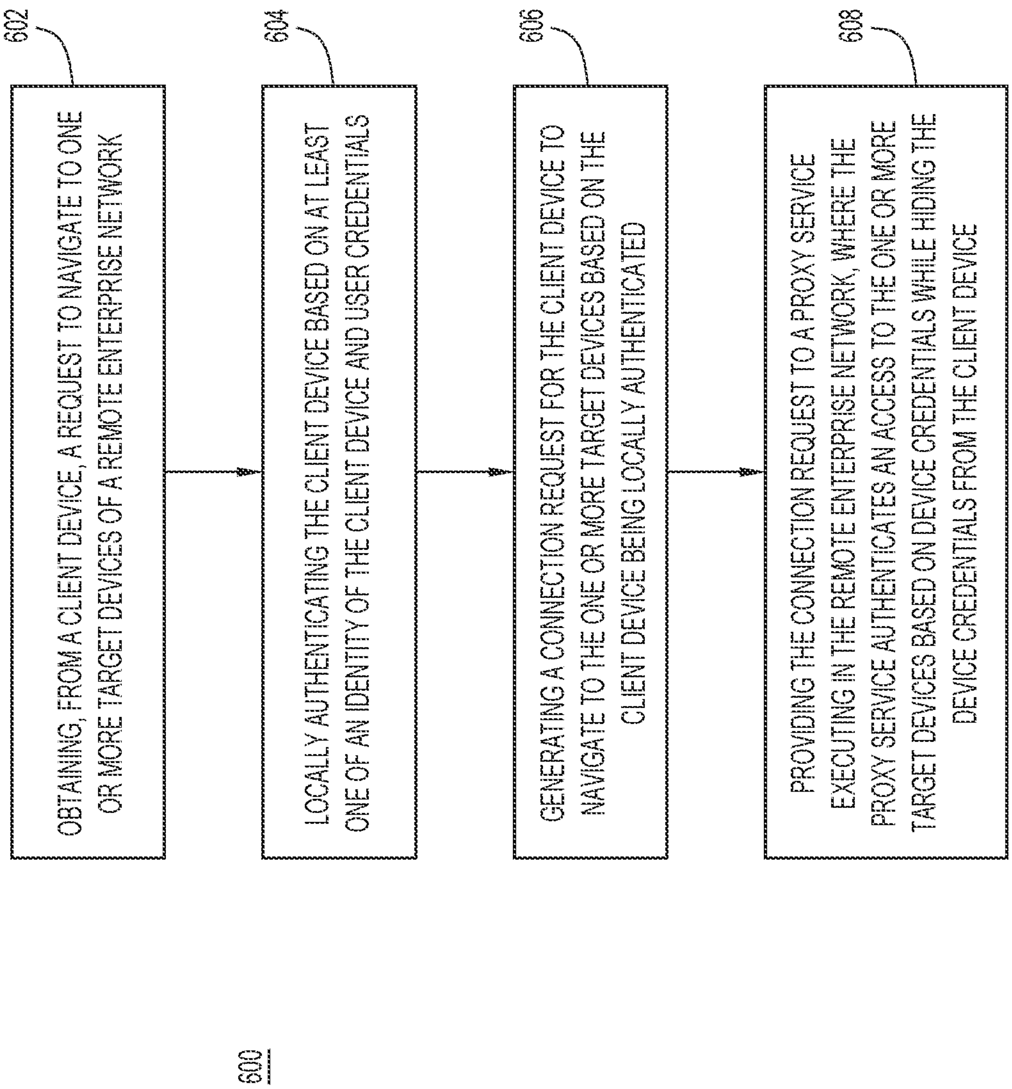
FIG. 6A is a flowchart illustrating a method in which a local client proxy authenticates a client device and provides a connection request to a reverse proxy service to navigate to one or more target devices of an enterprise network, according to an example embodiment.

FIG. 6A is a flowchart illustrating a computer-implemented method 600 in which a local client proxy authenticates a client device and provides a connection request to a reverse proxy service to navigate to one or more target devices of an enterprise network, according to an example embodiment. The computer-implemented method 600 may be executed by a local client proxy such as the local client proxy 104*a* of FIG. 1, FIG. 2, or FIG. 3, or the forward proxy 420 of FIG. 4, or the forward HTTP proxy 520 of FIG. 5, which may be executed on a computing device, one or more servers, and/or cloud.

The computer-implemented method 600 involves at 602, obtaining, from a client device, a request to navigate to one or more target devices of a remote enterprise network.

The computer-implemented method 600 further involves at 604, locally authenticating the client device based on at least one of an identity of the client device and user credentials.

The computer-implemented method 600 further involves at 606, generating a connection request for the client device to navigate to the one or more target devices based on the client device being locally authenticated.

The computer-implemented method 600 further involves at 608, providing the connection request to a proxy service executing in the remote enterprise network. The proxy service authenticates an access to the one or more target devices based on device credentials while hiding the device credentials from the client device.

In one form, the identity of the client device and the user credentials may be hidden from the one or more target devices.

In another form, the proxy service may authenticate the access to the one or more target devices using one or more device specific authentication methods.

According to one or more example embodiments, the proxy service may authenticate the access to at least two target devices using different device specific authentication methods. The identity of the client device and the user credentials may not be shared with the proxy service for authenticating the access.

In one instance, the computer-implemented method 600 may further involve obtaining, from the proxy service, a connection response for establishing a connection for the client device to navigate to the at least two target devices without including the device credentials of the at least two target devices.

According to one or more example embodiments, the computer-implemented method 600 may further involve forwarding the connection response to the client device for establishing a connection with the at least two target devices for troubleshooting or changing configurations of the at least two target devices.

According to one or more example embodiments, the connection response may include a fake session token for a respective target device. The fake session token may replace a session token stored at the proxy service and used for the access to the respective target device.

In one form, the computer-implemented method 600 may further include establishing an end-to-end encrypted connection between the client device and the one or more target devices.

Figure 6B:
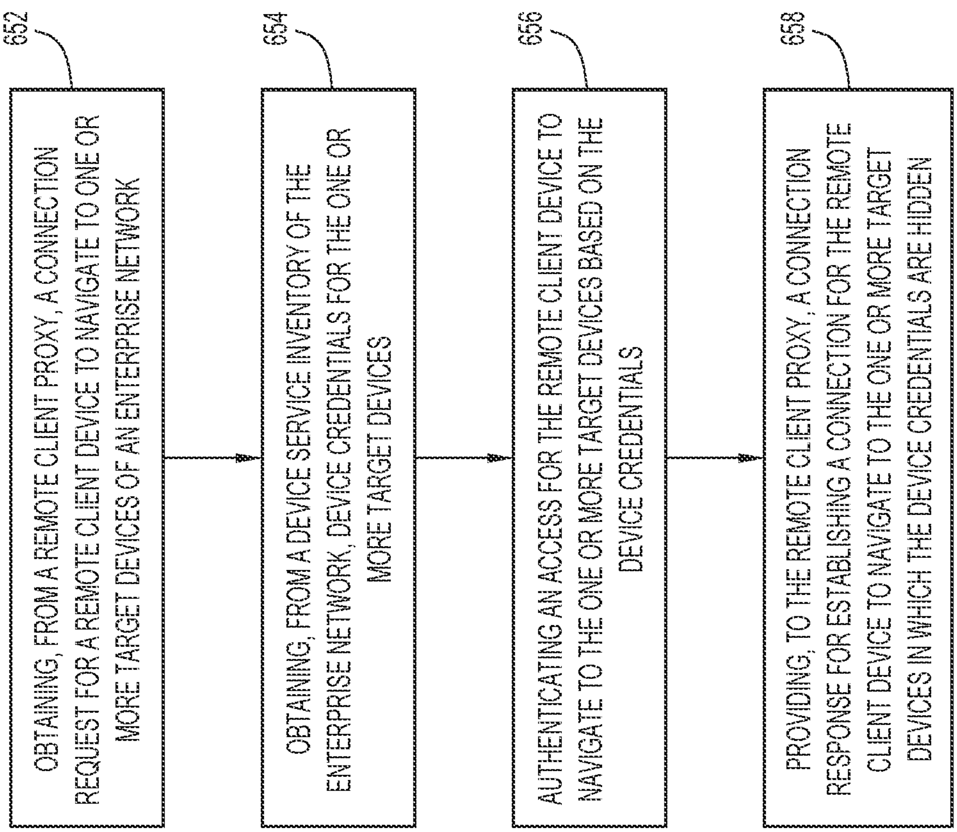
FIG. 6B is a flowchart illustrating a method in which a reverse proxy service authenticates access for a remote client device to navigate to the one or more target devices, according to an example embodiment.

FIG. 6B is a flowchart illustrating a computer-implemented method 650 in which a reverse proxy service authenticates access for a remote client device to navigate to the one or more target devices, according to an example embodiment. The computer-implemented method 650 may be executed by a reverse proxy service such as the reverse proxy service 104*b* of FIG. 1, FIG. 2, or FIG. 3, or the reverse proxy 440 of FIG. 4, or the reverse proxy 540 of FIG. 5, executed on a computing device, one or more servers, and/or cloud.

The computer-implemented method 650 involves at 652, obtaining, from a remote client proxy, a connection request for a remote client device to navigate to one or more target devices of an enterprise network.

The computer-implemented method 650 further involves at 654, obtaining, from a device service inventory of the enterprise network, device credentials for the one or more target devices.

The computer-implemented method 650 further involves at 656, authenticating an access for the remote client device to navigate to the one or more target devices based on the device credentials.

The computer-implemented method 650 further involves at 658, providing, to the remote client proxy, a connection response for establishing a connection for the remote client device to navigate to the one or more target devices in which the device credentials are hidden.

According to one or more example embodiments, the connection request may exclude an identity of the remote client device and user credentials.

In one form, the remote client proxy may authenticate the remote client device based on the identity and the user credentials and may generate the connection request based on authenticating the remote client device.

In another form, the operation 656 of authenticating the access for the remote client device to navigate to the one or more target devices may include determining a specific authentication method for each of the one or more target devices and authenticating the access using the specific authentication method.

According to one or more example embodiments, the one or more target devices may include at least two target devices that are authenticated using different specific authentication methods.

In one instance, the remote client device may establish a connection with the one or more target devices based on the connection response for troubleshooting or changing a configuration of the one or more target devices.

In another instance, the computer-implemented method 650 may further include generating a session token for the access to each of the one or more target devices and generating the connection response in which the session token is replaced with a fake session token hiding the device credentials.

According to one or more example embodiments, the computer-implemented method 650 may further include establishing an end-to-end encrypted connection between the remote client device and the one or more target devices.

Figure 7:
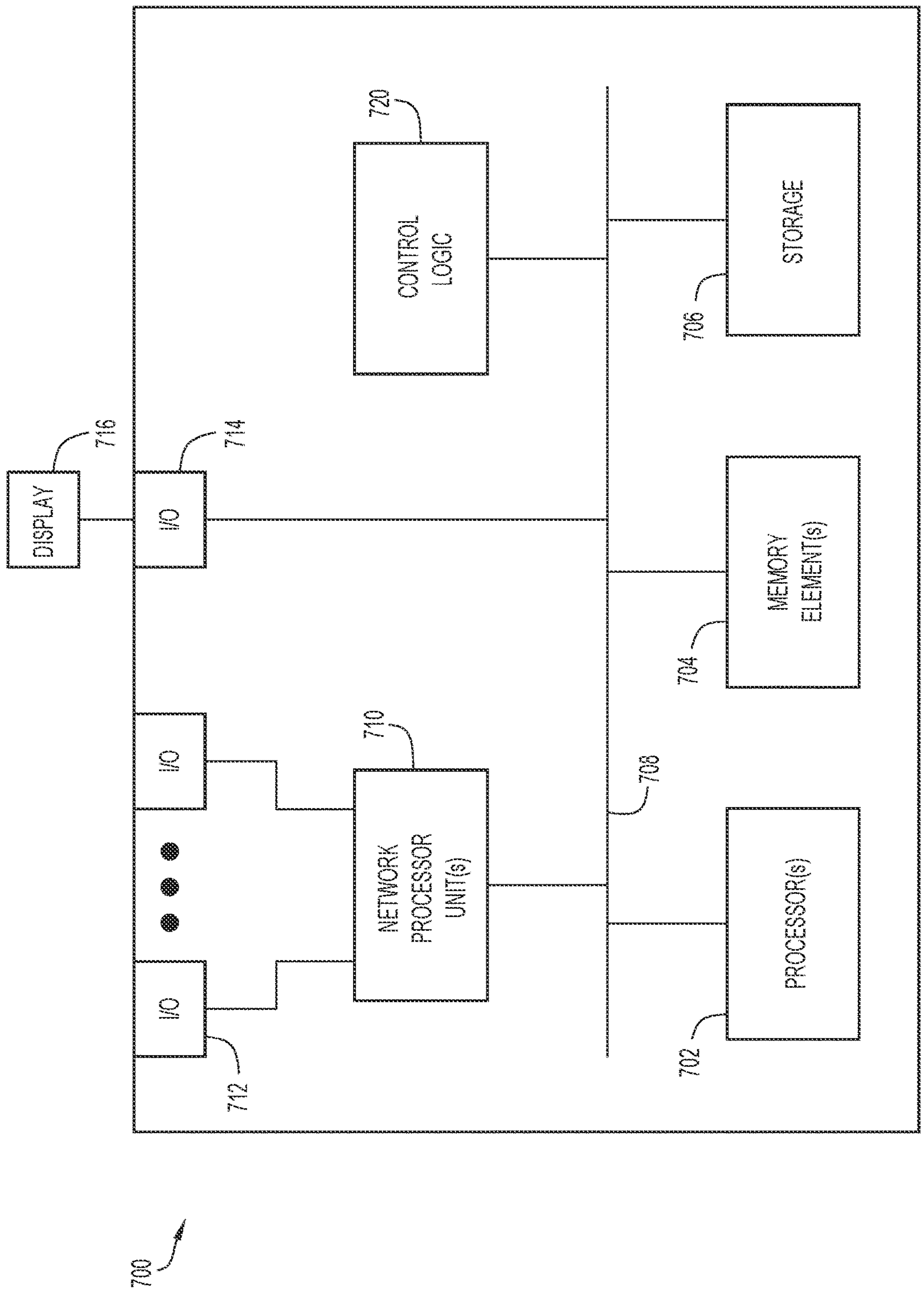
FIG. 7 is a hardware block diagram of a computing device that may perform functions associated with any combination of operations in connection with the techniques depicted and described in FIGS. 1-5, 6A, and 6B, according to various example embodiments.

FIG. 7 is a hardware block diagram of a computing device 700 that may perform functions associated with any combination of operations in connection with the techniques depicted in FIGS. 1-6B, according to various example embodiments, including, but not limited to, operations of a console that may be executing the client device 102 of FIGS. 1 and 2 or the web browser 310 of FIG. 3 or the application client 410 of FIG. 4 or the browser 510 of FIG. 5, or operations of one or more servers executing the proxy infrastructure 104 of FIG. 1, or the local client proxy 204*a* of FIG. 2, or the cloud infrastructure 202 of FIG. 2, or the reverse proxy service 204*b* of FIG. 2, or the client server 320 of FIG. 3, or the cloud infrastructure 330 of FIG. 3, or the on-prem service 340 of FIG. 3, or the forward proxy 420 of FIG. 4, the forwarder cloud service 430 of FIG. 4, or the reverse proxy 440 of FIG. 4, or the forward HTTP proxy 520 of FIG. 5, or the forwarder cloud service 530 of FIG. 5, or the reverse proxy 540 of FIG. 5, or a network device such as the target devices 106*a*-*m* of FIGS. 1 and 2, or the target device 350*a* of FIG. 3, or the network management service 460 of FIG. 4, or the target device 560 of FIG. 5, or a memory storage such as the device inventory storage 210 of FIG. 2 or the credentials and session storage 450 of FIGS. 4 and 5. It should be appreciated that FIG. 7 provides only an illustration of one embodiment and does not imply any limitations with regard to the environments in which different embodiments may be implemented. Many modifications to the depicted environment may be made.

In at least one example embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one example embodiment, processor(s) 702 is/are at least one hardware processor configured to execute various tasks, operations and/or functions for computing device 700 as described herein according to software and/or instructions configured for computing device 700. Processor (s) 702 (e.g., a hardware processor) can execute any type of instructions associated with data to achieve the operations detailed herein. In one example, processor(s) 702 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one example embodiment, one or more memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with one or more memory elements 704 (or vice versa), or can overlap/exist in any other suitable manner.

In at least one example embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various example embodiments, network processor unit (s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface (s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 716, a display screen, or the like.

In various embodiments, control logic 720 can include instructions that, when executed, cause processor(s) 702 to perform operations, which can include, but not be limited to, providing overall control operations of computing device;

interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided configured to execute a local client proxy 104*a* of FIG. 1, the local client proxy 204*a* of FIG. 2, the client server 320 of FIG. 3, the forward proxy 420 of FIG. 4, or the forward HTTP proxy 520 of FIG. 5. The apparatus includes a memory, a network interface configured to enable network communications and a processor. The processor is configured to perform a method that includes obtaining, from a client device, a request to navigate to one or more target devices of a remote enterprise network and locally authenticating the client device based on at least one of an identity of the client device and user credentials. The method further includes generating a connection request for the client device to navigate to the one or more target devices based on the client device being locally authenticated and providing the connection request to a proxy service executing in the remote enterprise network. The proxy service authenticates an access to the one or more target devices based on device credentials while hiding the device credentials from the client device.

In yet another example embodiment, an apparatus is provided configured to execute the reverse proxy service 104*b* of FIG. 1, the reverse proxy service 204*b* of FIG. 2, the on-prem service 340 of FIG. 3, the reverse proxy 440 of FIG. 4, or the reverse proxy 540 of FIG. 5. The apparatus includes a memory, a network interface configured to enable network communications and a processor. The processor is configured to perform a method that includes obtaining, from a remote client proxy, a connection request for a remote client device to navigate to one or more target devices of an enterprise network and obtaining, from a device service inventory of the enterprise network, device credentials for the one or more target devices. The method further includes authenticating an access for the remote client device to navigate to the one or more target devices based on the device credentials and providing, to the remote client proxy, a connection response for establishing a connection for the remote client device to navigate to the one or more target devices in which the device credentials are hidden.

In yet another example embodiment, one or more non-transitory computer readable storage media encoded with instructions are provided. When the media is executed by a processor, the instructions cause the processor to execute a method including obtaining, from a client device, a request to navigate to one or more target devices of a remote enterprise network and locally authenticating the client device based on at least one of an identity of the client device and user credentials. The method further includes generating a connection request for the client device to navigate to the one or more target devices based on the client device being locally authenticated. The method further includes providing the connection request to a proxy service executing in the remote enterprise network. The proxy service authenticates an access to the one or more target devices based on device credentials while hiding the device credentials from the client device.

In yet another example embodiment, one or more non-transitory computer readable storage media encoded with instructions are provided. When the media is executed by a processor, the instructions cause the processor to execute a method including obtaining, from a remote client proxy, a connection request for a remote client device to navigate to one or more target devices of an enterprise network and obtaining, from a device service inventory of the enterprise network, device credentials for the one or more target devices. The method further includes authenticating an access for the remote client device to navigate to the one or more target devices based on the device credentials and providing, to the remote client proxy, a connection response for establishing a connection for the remote client device to navigate to the one or more target devices in which the device credentials are hidden.

In yet another example embodiment, a system is provided that includes the devices and operations explained above with reference to FIGS. 1-7.

The programs described herein (e.g., control logic 720) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 706 and/or memory element(s) 704 can store data, software, code, instructions (e.g., processor instructions), logic, parameters, combinations thereof, and/or the like used for operations described herein. This includes the storage 706 and/or memory element(s) 704 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer usable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A computer-implemented method comprising:
- obtaining, from a client device, a request to navigate to one or more target devices of a remote enterprise network;
- locally authenticating the client device based on at least one of an identity of the client device and user credentials;
- generating a connection request for the client device to navigate to the one or more target devices based on the client device being locally authenticated; and
- providing the connection request to a proxy service executing in the remote enterprise network, wherein the proxy service authenticates an access to the one or more target devices based on device credentials while hiding the device credentials of the one or more target devices from the client device.

2. The computer-implemented method of claim 1, wherein the identity of the client device and the user credentials are hidden from the one or more target devices.

3. The computer-implemented method of claim 1, wherein the proxy service authenticates the access to the one or more target devices using one or more device specific authentication methods.

4. The computer-implemented method of claim 1, wherein the proxy service authenticates the access to at least two target devices using different device specific authentication methods, and the identity of the client device and the user credentials are not shared with the proxy service for authenticating the access.

5. The computer-implemented method of claim 4, further comprising:
- obtaining, from the proxy service, a connection response for establishing a connection for the client device to navigate to the at least two target devices without including the device credentials of the at least two target devices.

6. The computer-implemented method of claim 5, further comprising:
- forwarding the connection response to the client device for establishing a connection with the at least two target devices for troubleshooting or changing configurations of the at least two target devices.

7. The computer-implemented method of claim 5, wherein the connection response includes a fake session token for a respective target device and wherein the fake session token replaces a session token stored at the proxy service and used for the access to the respective target device.

8. The computer-implemented method of claim 1, further comprising:
- establishing an end-to-end encrypted connection between the client device and the one or more target devices.

9. The computer-implemented method of claim 8, wherein establishing the end-to-end encrypted connection between the client device and the one or more target devices includes:
- establishing a first encrypted connection between the client device and a client proxy, wherein the client proxy establishes a second encrypted connection with the proxy service and the proxy service establishes a third encrypted connection with the one or more target devices.

10. The computer-implemented method of claim 1, wherein the proxy service authenticates the access to the one or more target devices by replacing a session token with a fake session token and providing the fake session token in a connection response to a client proxy associated with the client device.

11. A computer-implemented method:
- obtaining, from a remote client proxy, a connection request for a remote client device to navigate to one or more target devices of an enterprise network;
- obtaining, from a device service inventory of the enterprise network, device credentials for the one or more target devices;
- authenticating an access for the remote client device to navigate to the one or more target devices based on the device credentials; and
- providing, to the remote client proxy, a connection response for establishing a connection for the remote client device to navigate to the one or more target devices in which the device credentials of the one or more target devices are hidden.

12. The computer-implemented method of claim 11, wherein the connection request excludes an identity of the remote client device and user credentials.

13. The computer-implemented method of claim 12, wherein the remote client proxy authenticates the remote client device based on the identity and the user credentials and generates the connection request based on authenticating the remote client device.

14. The computer-implemented method of claim 11, wherein authenticating the access for the remote client device to navigate to the one or more target devices includes:
- determining a specific authentication method for each of the one or more target devices; and
- authenticating the access using the specific authentication method.

15. The computer-implemented method of claim 14, wherein the one or more target devices includes at least two target devices that are authenticated using different specific authentication methods.

16. The computer-implemented method of claim 11, wherein the remote client device establishes the connection with the one or more target devices based on the connection response for troubleshooting or changing a configuration of the one or more target devices.

17. The computer-implemented method of claim 11, further comprising:
- generating a session token for the access to each of the one or more target devices; and
- generating the connection response in which the session token is replaced with a fake session token hiding the device credentials.

18. The computer-implemented method of claim 11, further comprising:

establishing an end-to-end encrypted connection between the remote client device and the one or more target devices.

19. An apparatus comprising:

a memory;

a network interface configured to enable network communications; and a processor, wherein the processor is configured to perform a method comprising:

obtaining, from a client device, a request to navigate to one or more target devices of a remote enterprise network;

locally authenticating the client device based on at least one of an identity of the client device and user credentials;

generating a connection request for the client device to navigate to the one or more target devices based on the client device being locally authenticated; and providing the connection request to a proxy service executing in the remote enterprise network, wherein the proxy service authenticates an access to the one or more target devices based on device credentials of the one or more target devices while hiding the device credentials from the client device.

20. The apparatus of claim 19, wherein the identity of the client device and the user credentials are hidden from the one or more target devices.

* * * * *